United States Patent [19]

Horiuchi

[11] Patent Number: 4,582,170
[45] Date of Patent: Apr. 15, 1986

[54] OIL SEAL PACKING LUBRICATING SYSTEM OF MANUAL TRANSMISSION

[75] Inventor: Yusuke Horiuchi, Toyota, Japan

[73] Assignee: Toyota Jidosha Kabushiki Kaisha, Toyota, Japan

[21] Appl. No.: 760,811

[22] Filed: Jul. 31, 1985

[30] Foreign Application Priority Data

Aug. 22, 1984 [JP] Japan .............. 59-127350[U]

[51] Int. Cl.$^4$ ............................................. F16H 57/04
[52] U.S. Cl. ............................. 184/6.12; 74/467; 277/15; 277/67; 277/68
[58] Field of Search .............. 74/467; 184/5.1, 6.12, 184/11.1, 11.2, 11.3, 13.1; 277/15, 67, 68, 215

[56] References Cited

U.S. PATENT DOCUMENTS

| | | | |
|---|---|---|---|
| 1,670,471 | 5/1928 | Merkt | 184/13.1 |
| 3,508,630 | 4/1970 | Keller et al. | 74/467 X |
| 3,529,698 | 9/1970 | Nelson | 184/11.2 X |
| 3,838,751 | 10/1974 | Brown | 184/6.12 |
| 4,018,097 | 4/1977 | Ross | 184/11.2 X |
| 4,359,909 | 11/1982 | Sogo | 74/467 |

FOREIGN PATENT DOCUMENTS

| | | | |
|---|---|---|---|
| 146327 | 11/1979 | Japan | 74/467 |
| 163860 | 9/1983 | Japan | 74/467 |
| 23158 | 2/1984 | Japan | 74/467 |

Primary Examiner—Leonard E. Smith
Attorney, Agent, or Firm—Parkhurst & Oliff

[57] ABSTRACT

An oil seal packing lubricating system of a manual transmission in which the lubricant is supplied from outside of the oil seal packing, including a lubricant introducing rib for guiding the lubricant fed from outside to a lip surface of the oil seal packing in a zone where an outer surface of the input shaft moves upwardly during its rotation, and at least one lubricant deflecting rib for deflecting a swirling flow of lubricant toward the lip surface of the oil seal packing. The Lubricant deflecting rib is shaped such that it draws nearer to the outer surface of the input shaft in going in the direction of rotation of the input shaft.

2 Claims, 3 Drawing Figures

OIL SEAL PACKING LUBRICATING SYSTEM OF MANUAL TRANSMISSION

BACKGROUND OF THE INVENTION

This invention relates to a lubricating system for an oil seal packing mounted to a portion of an input shaft of a manual transmission which extends through a wall of a transmission case.

In feeding a lubricant to the oil seal packing mounted to the rotary input shaft of a manual transmission, it has hitherto been usual practice to feed the lubricant from outside instead of forming oil grooves inside the input shaft. When this feeding method is employed, lubricant flowing toward a sealed portion of the input shaft from outside begins to swirl about the input shaft as it draws nearer to the input shaft, and tends to be thrown away therefrom by centrifugal forces produced by an increase in the speed of its swirling. Owing to this phenomenon, difficulties have been experienced in lubricating the sealed portion satisfactorily. To solve this problem, the applicant of this invention has made a proposal to provide an improved lubricating system, as disclosed in Japanese Utility Model Application Laid-Open No. 13377/77, which comprises a plurality of radial grooves or fins located radially outside of the sealed portion of the input shaft and oriented toward the center of the input shaft, to avoid the lubricant swirling about the rotating input shaft and allow the same to be forced by gravitational pull to drop on to the sealed portion.

This system of the prior art is considered to have some effect in feeding the lubricant satisfactorily to the sealed portion of the input shaft by preventing the lubricant from swirling about the rotating input shaft and from being adversely affected by the centrifugal forces. However, it has been found, as a result of the use of this method of the prior art, that practically effective grooves or fins for lubrication are, among many grooves or fins, only those which are located just above the sealed surface.

SUMMARY OF THE INVENTION

This invention has as its object the provision of an improved oil seal packing lubricating system of a manual transmission capable of feeding lubricant to the oil seal packing more effectively than lubricating systems of prior arts.

To accomplish the aforesaid object, the invention provides a plurality of ribs, some of which are directed such that it draws nearer to the input shaft in going in the direction of rotation of the input shaft for deflecting the flow of lubricant toward a seal surface as it swirls about the input shaft, and one of which is located just above the sealed portion so as to guide the lubricant to be supplied on the sealed portion to a zone in which the surface of the input shaft moves upwardly as it rotates, to thereby improve the efficiency of lubrication.

DESCRIPTION OF THE PREFERRED EMBODIMENT

Figure 3:
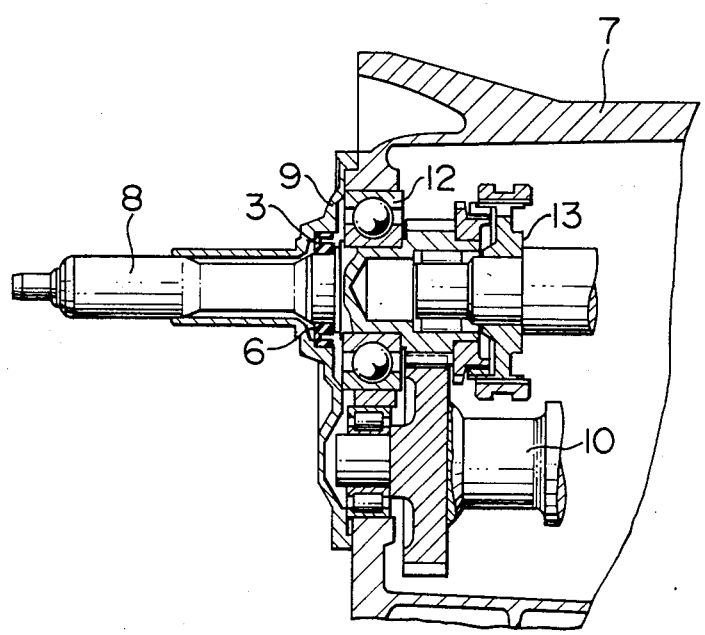
FIG. 3 is a view of the parts located in the vicinity of the input shaft of the manual transmission.

Referring to FIG. 3, a transmission comprises an input shaft 8 extending through a wall of a transmission case 7 and being journalled by a bearing 12 supported by the transmission case 7. The input shaft 8 engages a countershaft 10 and a synchromesh mechanism 13 located in the transmission case 7. A bearing retainer 9, which covers a front surface of the bearing 12 and an outer surface of the input near the bearing 12, is secured to the transmission case 7. Interposed between the input shaft 8 and retainer 9 is an annular oil seal packing 3 which is provided with a lip surface 6.

Figure 1:
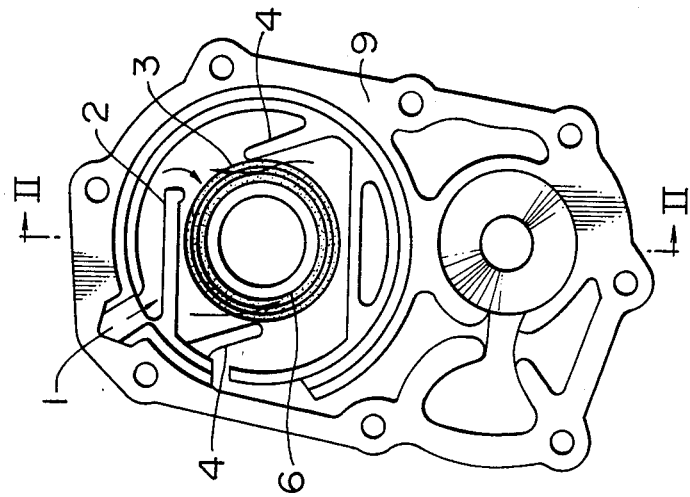
FIG. 1 is a front view of the bearing retainer.
Figure 2:
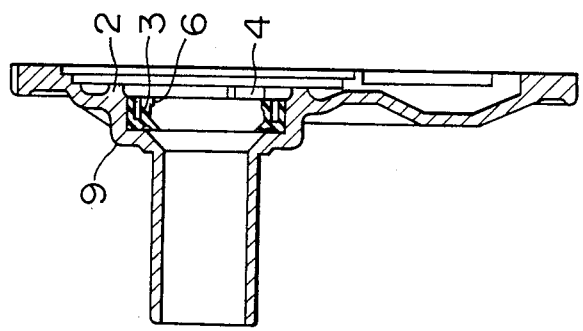
FIG. 2 is a sectional view taken along the line II—II in FIG. 1.

FIGS. 1 and 2 show, on an enlarged scale, the bearing retainer 9 having the oil seal packing 3 incorporated therein. Lubricant for the oil seal packing 3 is supplied to an oil port 1 formed in the bearing retainer 9 in a position located above the oil seal packing 3. An introducing rib 2 is located below the oil port 1 to introduce the lubricant which flows downwardly through the oil port 1 under the force of gravity to a portion of the input shaft 8 which is located rightward of the center of the input shaft 8 in FIG. 1 or to a zone in which the outer surface of the input shaft 8 moves upwardly during its anticlockwise rotation. The lubricant dropping into this zone begins to swirl on the surface of the rotating input shaft 8 while lubricating the lip surface 6 of the oil seal packing 3. As the swirling of the lubricant increases its speed, the lubricant tends to be outwardly thrown away from the input shaft 8 by centrifugal forces. At least one deflecting rib 4 (two deflecting ribs 4 are shown in FIG. 1 showing one embodiment of the invention) for deflecting the lubricant is located in the bearing retainer 9. The deflecting rib 4 is shaped such that it draws nearer to the input shaft 8 in going in the direction of rotating of the input shaft. By virtue of the deflecting rib 4, the flow of lubricant tending to separate itself away from the surface of the input shaft 8 under the influences of centrifugal forces is deflected toward the surface of the input shaft 8 to reach the lip surface 6 of the oil seal packing 3.

As mentioned above, according to the invention, the gravity force is effectively utilized to cause the lubricant flow downwardly by its own weight and to drop into a zone where the outer surface of the input shaft moves upwardly during its rotation. Further, the swirling flow of the lubricant induced by the rotation of the input shaft is effectively deflected by at least one deflecting rib in the vicinity of the oil seal packing, to thereby improve the efficiency of lubrication for the oil seal packing.

What is claimed is:

1. An oil seal packing lubricating system of a manual transmission, in which the lubricant is supplied from outside of the oil seal packing, comprising:
    lubricant introducing means for guiding the lubricant fed from outside the input shaft to a lip surface of the oil seal packing in a zone where an outer surface of the input shaft moves upwardly during its rotation; and
    lubricant deflecting means for deflecting a swirling flow of lubricant toward the lip surface of the oil seal packing, said lubricant deflecting means being shaped such that it draws nearer to the outer surface of the input shaft in going in the direction of rotation of the input shaft.

2. An oil seal packing lubricating system as claimed in claim 1, wherein said lubricant introducing means and lubricant deflecting means are integrally formed on an inner wall of a bearing retainer for the input shaft.